US 8,204,013 B2

(12) United States Patent
Lewis

(10) Patent No.: US 8,204,013 B2
(45) Date of Patent: Jun. 19, 2012

(54) METHOD AND DEVICE FOR DETECTING A GSM CHANNEL OF INTEREST

(75) Inventor: Jonathan David Lewis, Alpes Maritimes (FR)

(73) Assignee: Motorola Mobility, Inc., Libertyville, IL (US)

( * ) Notice: Subject to any disclaimer, the term of this patent is extended or adjusted under 35 U.S.C. 154(b) by 814 days.

(21) Appl. No.: 12/360,883

(22) Filed: Jan. 28, 2009

(65) Prior Publication Data
US 2009/0209253 A1 Aug. 20, 2009

(30) Foreign Application Priority Data

Feb. 15, 2008 (EP) ..................................... 08305024

(51) Int. Cl.
*H04W 4/00* (2009.01)
*H04B 7/212* (2006.01)
(52) U.S. Cl. ......... 370/329; 370/347; 370/431; 370/208
(58) Field of Classification Search ........................ None
See application file for complete search history.

(56) References Cited

U.S. PATENT DOCUMENTS

| 5,367,536 A * | 11/1994 | Tsujimoto | 375/269 |
| 6,683,919 B1 * | 1/2004 | Olgaard et al. | 375/316 |
| 6,775,261 B1 | 8/2004 | Banister | |
| 7,567,637 B2 * | 7/2009 | Liang et al. | 375/343 |
| 7,593,482 B2 * | 9/2009 | Gong et al. | 375/316 |
| 2003/0080814 A1 * | 5/2003 | Ode et al. | 330/149 |
| 2005/0111529 A1 | 5/2005 | Bradley | |
| 2006/0067437 A1 * | 3/2006 | Vis et al. | 375/343 |
| 2006/0072685 A1 * | 4/2006 | Gong et al. | 375/316 |
| 2006/0072688 A1 * | 4/2006 | Liang et al. | 375/343 |
| 2008/0292036 A1 * | 11/2008 | Wilhelmsson et al. | 375/348 |
| 2009/0209253 A1 * | 8/2009 | Lewis | 455/434 |

FOREIGN PATENT DOCUMENTS

| GB | 2386506 A | 9/2003 |
| WO | 0031998 A | 6/2000 |
| WO | 2007022429 A | 2/2007 |

* cited by examiner

*Primary Examiner* — Steven H Nguyen
(74) *Attorney, Agent, or Firm* — Sylvia Chen

(57) ABSTRACT

A method for detecting a GSM channel of interest, in a wireless communication device capable of supporting broadband as well as narrowband wireless systems, includes receiving (210) analog signals across a wide bandwidth and identifying (220) possible GSM channels within that wide bandwidth. The wireless communication device then samples (230) the analog signals to produce a time domain digital signal and further chooses (240) a pair of frequencies that correspond to a possible GSM channel. The wireless communication device converts (260) the time domain digital signal at the chosen pair of frequencies into first and second frequency domain digital signals and calculates (270) a power ratio between the first frequency domain digital signal and the second frequency domain digital signal. If the calculated power ratio for the possible GSM channel exceeds a threshold, the wireless communication device determines (280) that the possible GSM channel is the GSM channel of interest.

21 Claims, 4 Drawing Sheets

_US 8,204,013 B2_

METHOD AND DEVICE FOR DETECTING A GSM CHANNEL OF INTEREST

FIELD OF THE DISCLOSURE

The present disclosure relates generally to wireless communication devices and, more particularly, to a technique for detecting a GSM channel of interest for a wireless communication device.

BACKGROUND

Wireless communication devices capable of supporting broadband (e.g., 5 MHz) wireless communications (e.g., LTE and/or OFDM systems) as well as narrowband (e.g., 200 KHz) wireless communications (e.g., GSM systems), may be required to search for a narrowband GSM channel when the broadband system signal is weak or absent. Following a traditional sequential approach of searching for a GSM channel of interest can be a slow and power hungry approach. Accordingly, there is a need for a new searching method in a wireless communication device capable of operating in broadband and narrowband wireless communication systems, which can reduce the amount of time and power it takes to detect a GSM channel of interest.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
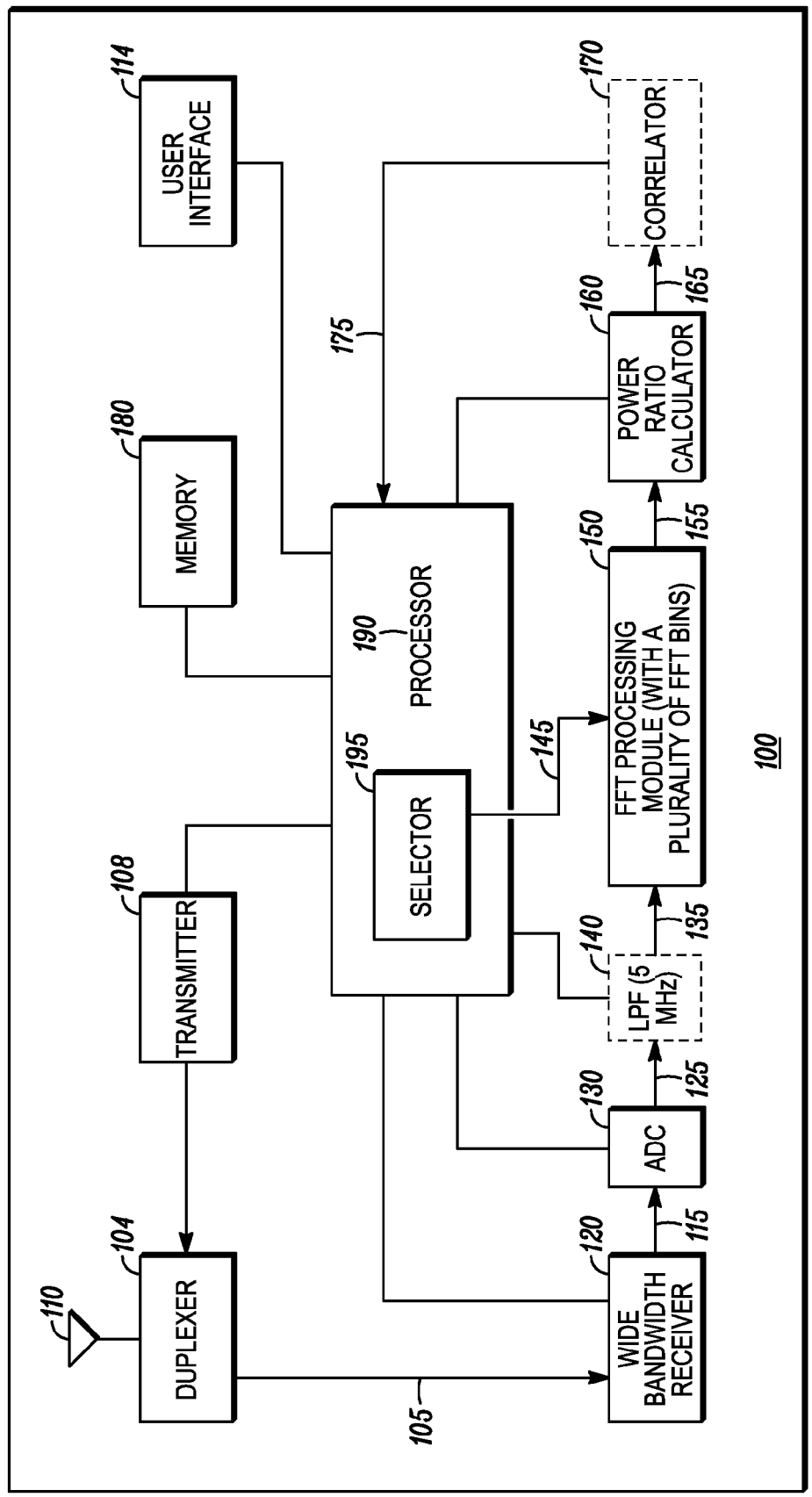
FIG. 1 is a block diagram of a wireless communication device in accordance with some embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

A wireless communication device receives analog signals across a wide bandwidth and identifies possible GSM channels within the received analog signals. The wireless communication device then samples the analog signals to produce a time domain digital signal and further chooses pairs of frequencies that correspond to a number of possible GSM channels (e.g., each pair of frequencies corresponds to a center frequency of a possible GSM channel and the synchronization burst frequency corresponding to that possible GSM channel). The wireless communication device then converts the time domain digital signals at each of the chosen pairs of frequencies into first and second frequency domain digital signals and calculates a power ratio between the first frequency domain digital signal and the second frequency domain digital signal. By simultaneously calculating the power ratio for a number of possible GSM channels, the wireless communication device can quickly determine whether one of the possible GSM channels is a GSM channel of interest, if the calculated power ratio for a possible GSM channel exceeds a threshold for example.

FIG. 1 is a block diagram of a wireless communication device 100 in accordance with some embodiments. The wireless communication device 100 includes a user interface 114, an antenna 110, a transmitter 108, a duplexer 104, a wide bandwidth receiver 120, an analog to digital converter (ADC) 130, a low pass filter (LPF) 140, a processor 190 with a selector 195 of fast Fourier transform (FFT) bins, an FFT processing module 150 (implementing a plurality of FFT bins), a power ratio calculator 160, a correlator 170, and a memory 180. The user interface 114, for example, can include a microphone, an audio speaker, a display, a keyboard, and so on. The antenna 110 receives and transmits wireless analog signals spread over a wide bandwidth. The transmitter transmits a signal out through a duplexer 104 and the antenna 110. The duplexer 104 is responsible for simultaneous transmission and reception of signals. In addition to standard reception of wide bandwidth communications (e.g., 5 MHz LTE and/or OFDM signals), the wide bandwidth receiver 120 is also used for identifying narrower GSM channels of interest. The processor 190 includes a selector 195 and is connected to memory 180, which is used for storage.

The antenna 110 receives analog signals 105 spread over a wide bandwidth and passes them to the wide bandwidth receiver 120, through the duplexer 104. The wide bandwidth receiver 120 identifies possible GSM channels from the received analog signals 105 and down-converts any possible GSM signals within those possible GSM channels to baseband. For example, assume that several possible GSM channels are located within a wide bandwidth between 934.7 and 939.7 MHz. Then the wide bandwidth receiver 120 is set to receive at a center frequency of 937.2 MHz with a bandwidth of at least 5 MHz. (In operation, the bandwidth at this stage is usually 7-8 MHz.) After mixing down to baseband, possible GSM signals from the possible GSM channels are now contained within analog signals 115 at 0-5 MHz at the output of the wide bandwidth receiver 120.

In conventional wireless communication devices, a GSM receiver is capable of analyzing only one standard 200 KHz possible GSM channel at a time. In contrast, in the wireless communication device 100, the wide bandwidth receiver 120 is capable of analyzing several standard 200 KHz possible GSM channels at one time. In this example, the 5 MHz wide bandwidth receiver can identify up to 25 GSM channels at a time. In other embodiments, a wide bandwidth can be three times, five times, ten times, or larger multiples of the narrow channel for which the device is searching. Because the wireless communication device 100 is capable of supporting broadband wireless communications (such as an LTE and/or OFDM system), the wide bandwidth receiver 120 implemented for the broadband wireless communications is re-used to also analyze a number of narrower possible GSM channels.

The ADC 130 samples the baseband analog signals 115 to produce a plurality of time domain digital signals 125. And the LPF 140 limits the plurality of time domain digital signals 125 to the desired wide frequency bandwidth time domain digital signals 135. For example, the LPF 140 limits the time domain digital signals 125 to a 5 MHz bandwidth. Thus, if the wide bandwidth receiver 120 captures a coarse range of frequencies (e.g., 7-8 MHz) then the LPF 140 fine tunes that range of frequencies. The LPF 140 becomes optional if the cut-off of the wide bandwidth receiver 120 is steep; however, conventional wide bandwidth receivers are currently not capable of such a steep cut-off without undue distortion.

Based on GSM channel information available at the memory 180 and the selected frequencies at the wide bandwidth receiver 120, the selector 195 chooses a pair of frequencies for each of the possible GSM channels.

Figure 3:
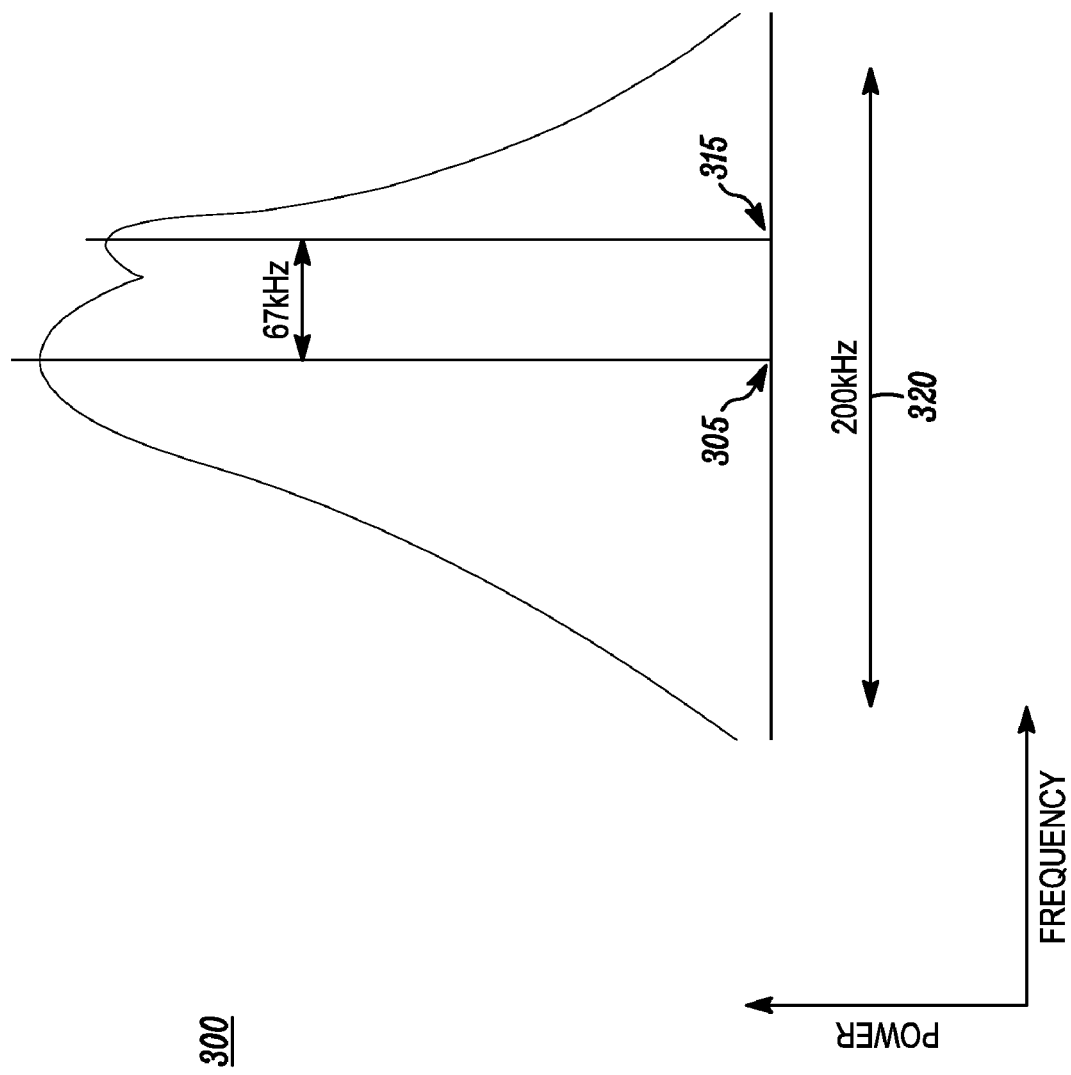
FIG. 3 is an example of a possible GSM channel of interest in accordance with some embodiments.

The chosen pair of frequencies for a possible GSM channel corresponds to a center frequency of the possible GSM channel and a corresponding synchronization burst frequency of the possible GSM channel. An example of a possible GSM channel is shown as channel 300 in FIG. 3. The possible GSM channel 300 is spread across a frequency band 320 of 200 KHz. If there were GSM signals on the possible GSM channel 300, the center frequency 305 power measurement would exhibit power from the continuous beacon transmitted for the possible GSM channel 300. At set points in time, the GSM network transmits a synchronization burst (also called frequency correction burst FCH) for the continuous beacon channel. The synchronization burst is at a fixed frequency offset of 67.7 KHz from the center frequency 305, and the synchronization burst is transmitted at least once every 11 GSM frames. In other words, the synchronization burst is transmitted every 50.8 milliseconds, and the power measurement at the 67.7 KHz offset frequency is boosted relative to a standard roll-off during frames when the burst is transmitted. In the example of FIG. 3, the chosen pair of frequencies for the possible GSM channel 300 is the center frequency 305 and the synchronization burst frequency 315.

Returning to FIG. 1, assume there are two possible GSM channels 1 and 21. GSM channel 1 is centered at 935.2000 MHz with a synchronization burst frequency at 935.2677 MHz and GSM channel 21 is centered at 939.2000 MHz with a synchronization burst frequency at 939.2677 MHz. Because the high frequency analog signals have been mixed down 934.7 MHz to baseband, a first pair of frequencies for possible GSM channel 1 is 0.5000 MHz and 0.5677 MHz, and a second pair of frequencies for possible GSM channel 21 is at 4.5000 MHz and 4.5677 MHz. In one example, the possible GSM channels of interest may include a GSM channel used previously by the wireless communication device 100. In another example, the possible GSM channels may include a GSM channel indicated by signaling from an alternate radio system (e.g., an OFDM, WiFi, or LTE system). In yet another example, the possible GSM channels of interest may include a GSM channel preset by a user or a service provider.

After choosing one or more pairs of frequencies, the selector 195 uses a control signal 145 to configure the FFT processing module 150 so that only its constituent elements that contribute to the processing of the chosen pairs of frequencies are activated. The constituent elements of the FFT processing module 150 may include software and/or hardware for transforming an incoming time domain signal into a frequency domain signal with a plurality of FFT bins. The FFT processing module may also use a plurality of input basis functions in order to perform the transform. In one example, the selector 195 uses the control signal 145 to configure the input basis functions of the FFT processing module 150 for all the frequencies except the chosen pairs of frequencies to a null value (0).

To simplify the discussion about the operation of the FFT processing module 150 and in order to enable a better and complete understanding of the overall solution, configuring the FFT processing module 150 to activate only its constituent elements that contribute to the processing of the chosen pairs of frequencies is explained as turning ON specific FFT bins from the plurality of FFT bins implemented by the FFT processing module 150. (It is assumed that the non-ON FFT bins are OFF.) However, those skilled in the art will recognize and appreciate that turning ON specific FFT bins from the plurality of FFT bins of the FFT processing module 150 is merely illustrative of some embodiments and that the teachings set forth herein are applicable to a variety of alternate settings. For example, the function of turning ON specific FFT bins can be implementing using any method of configuring the FFT processing module 150 so that only its constituent elements that contribute to the processing of the chosen pairs of frequencies are activated.

For a single possible GSM channel, the selector 195 will turn ON two specific FFT bins. In one example, the number of FFT bins in the plurality of FFT bins implemented by the FFT processing module 150 is 1024 and the LPF 140 limits the signals to a 5 MHz frequency band. The selector 195 may find a maximum of 25 possible GSM channels (because one GSM channel is 200 KHz wide) and turn ON a maximum of 50 specific FFT bins. The first specific FFT bin for a possible GSM channel corresponds to the center frequency of the possible GSM channel and the second specific FFT bin for the possible GSM channel corresponds to the synchronization burst frequency of that possible GSM channel. The conversion frequency of the specific FFT bins may not correspond exactly to the center and offset frequencies of a possible GSM channel; however, closest FFT bins may be used.

The FFT processing module 150, as configured by the selector 195, converts the time domain digital signals 125 into first and second frequency domain digital signals 155 at the conversion frequencies of the pair of ON FFT bins. The power ratio calculator 160 calculates the power ratio between the first frequency domain digital signal and the second frequency domain digital signal. In one example, the power ratio calculator may use the amplitude of the frequency domain digital signals.

For a possible GSM channel, if the calculated power ratio exceeds a threshold, the processor 190 determines that the possible GSM channel is a GSM channel of interest. In one example, the power ratio calculator 160 calculates a power ratio 165 during a GSM frame of the possible GSM channel, for a minimum of 11 consecutive GSM frames. The processor determines that the possible GSM channel is a GSM channel of interest if the power ratio 165 exceeds a single-frame threshold during one of the 11 consecutive GSM frames. In another example, the power ratio calculator 160 calculates the power ratio 165 during a GSM frame of a possible GSM channel, and the correlator 170 accumulates the power ratios 165 for a pre-defined period of time (e.g., 51 milliseconds) and sends it to the processor 190. The processor checks if the accumulated power ratio value 175 exceeds an accumulated-frame threshold and determines that the possible GSM channel is the GSM channel of interest if the threshold is exceeded. In one example, the threshold may be preset by a service provider, device manufacturer, or user and stored in the memory 180. In another example, the threshold can be dynamic and adjusted based on the power level of signals in the possible GSM channel or based on an estimate of noise in the possible GSM channel.

As mentioned earlier, in conventional wireless communication devices, the receiver is capable of identifying GSM signals in only one standard 200 KHz GSM frequency band at a time. So, if a conventional wireless communication device processes 25 possible GSM channels to find GSM channels of interest, then it might sequentially process each of the 25 possible GSM channels for a minimum of 51 milliseconds (because a synchronization burst is transmitted every 50.8 milliseconds). This complete process will take 1275 milliseconds (51 milliseconds multiplied by 25), in the worst case when only the last possible GSM channel is a GSM channel of interest. In contrast, in the wireless communication device 100, the wide bandwidth receiver 120 is capable of identifying GSM signals in a multitude of standard 200 KHz GSM channels at a time. The selector 195 can select up to 25 possible narrow 200 KHz GSM channels within a wide 5 MHz bandwidth, and the FFT processing module 150 can process the time domain digital signals 125 simultaneously to produce up to 25 pairs of frequency domain digital signals 155 corresponding to the ON FFT bins. The pairs of frequency domain digital signals 155 can quickly be analyzed for features that indicate that the possible GSM channel contains GSM signals and thus is a GSM channel of interest. Because the wireless communication device 100 can simultaneously process up to 25 possible GSM channels simultaneously instead of sequentially, it can save a lot of time and power that could be used to transfer data or perform other functions.

Figure 2:
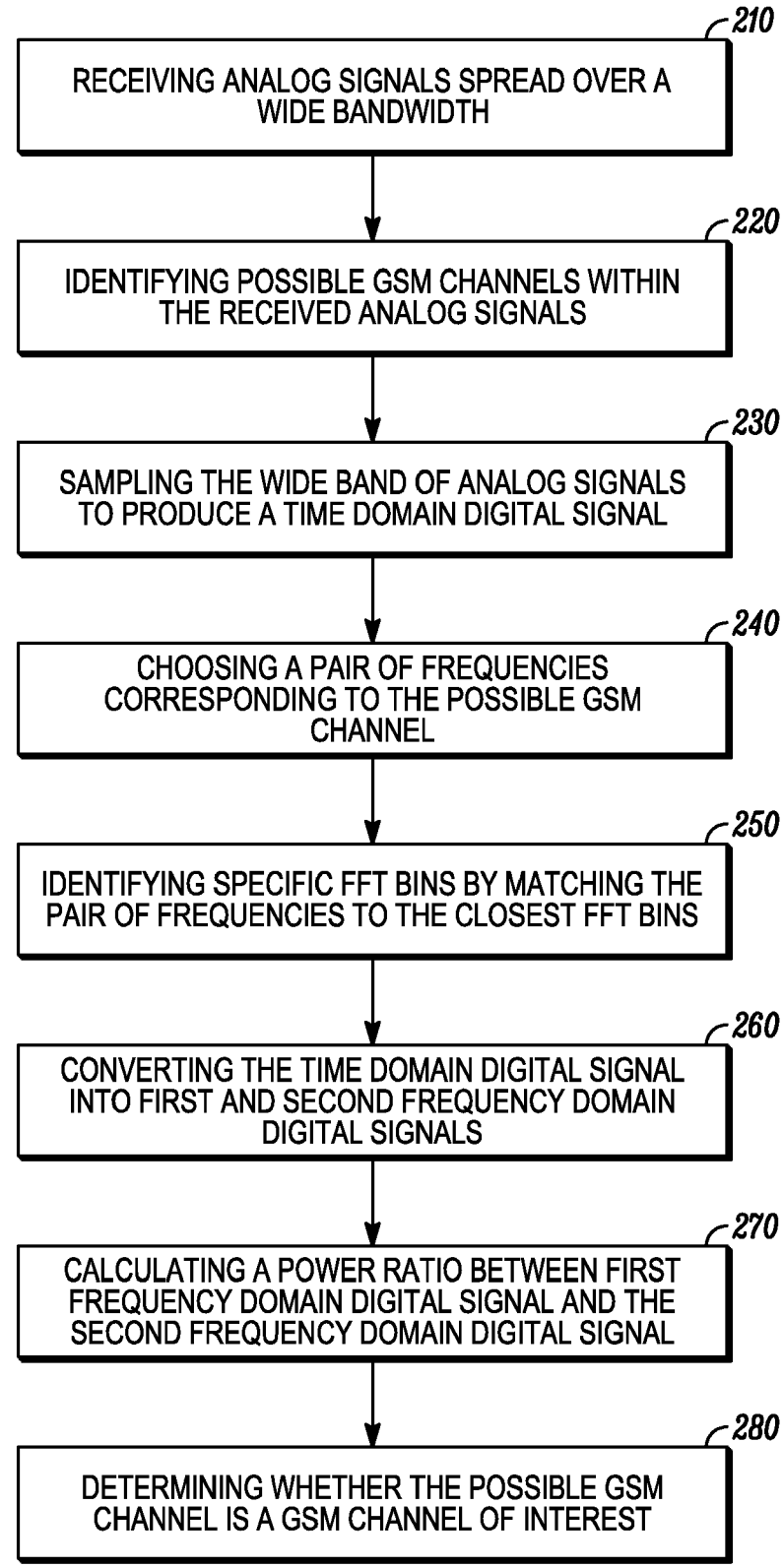
FIG. 2 is a flowchart of a method for a wireless communication device to detect a GSM channel of interest in accordance with some embodiments.

FIG. 2 is a flowchart 200 of a method for a wireless communication device (such as device 100 shown in FIG. 1) to detect a GSM channel of interest in accordance with some embodiments. The wireless communication device receives 210 analog signals spread over a wide bandwidth. In the example shown in FIG. 1, the wide bandwidth receiver 120, under direction of the processor 190, produces down-converted analog signals 115 having a bandwidth of 5 MHz. The wireless communication device also identifies 220 a number of possible GSM channels within the received, down-converted analog signals. In the example shown in FIG. 1, the processor 190 identifies the possible GSM frequency bands within the 5 MHz wide bandwidth. Note that receiving 210 and identifying 220 may be performed in the reverse order or simultaneously.

After receiving 210 and identifying 220, the wireless communication device samples 230 the wide band of analog signals to produce a time domain digital signal. In the example shown in FIG. 1, the ADC 130 within the wireless communication device 100 samples the wideband analog signal 115 to produce a time domain digital signal 125.

The wireless communication device then chooses 240 a pair of frequencies corresponding to a possible GSM channel. As explained earlier, the chosen pair of frequencies for a possible GSM channel corresponds to a center frequency of the possible GSM channel and a corresponding synchronization burst frequency of the possible GSM channel. In the example shown in FIG. 1, the processor 190 within the wireless communication device 100 chooses the pair of frequencies for a possible GSM channel.

After choosing, the wireless communication device identifies 250 a pair of specific FFT bins for the possible GSM channel by matching the chosen pair of frequencies to the closest FFT bins available from a fast Fourier transformer. The selector 195 shown in FIG. 1 can perform this function. Alternately, the processor 190 and selector 195 shown in FIG. 1 can implement both choosing 240 and identifying 250 using a table stored in memory 180 or using another pre-determined function. In one example, one or more of the frequencies in a chosen pair of frequencies may match exactly with one or more of the FFT bins in the plurality of FFT bins. In this case, the wireless communication device turns ON the identified FFT bin(s). In another example, one or more of the frequencies in a chosen pair of frequencies may be very close (but not match exactly) to FFT bin(s) in the plurality of FFT bins. In such a scenario, the wireless communication device may first decide which FFT bin to turn ON for the particular frequency in the chosen pair of frequencies and then turn ON the selected FFT bin. In another example, the wireless communication device may turn ON more than one FFT bin for one of the frequencies in a chosen pair of frequencies and can then interpolate the values from those two or more turned ON FFT bins.

Then the wireless communication device converts 260 the time domain digital signal into first and second frequency domain digital signals at the ON FFT bin frequencies. In the example shown in FIG. 1, the FFT processing module 150 within the wireless communication device 100 converts the time domain digital signal into the first and second frequency domain digital signals 155 for a possible GSM channel at the ON FFT bin frequencies. Because not all of the FFT bins are ON, this converting 260 does not consume as much power as a complete, wide bandwidth FFT conversion. As described in this example, a maximum of 50 out of 1024 FFT bins would be turned ON, and thus the power consumption much less than that of a complete, wide bandwidth FFT conversion.

The wireless communication device then calculates 270 a power ratio between the first frequency domain digital signal and the second frequency domain digital signal. In the example shown in FIG. 1, the power ratio calculator 160 within the wireless communication device 100 calculates the power ratio. After calculating, the wireless communication device determines 280 that the possible GSM channel is a GSM channel of interest, if the calculated power ratio exceeds a threshold. In one example, the wireless communication device calculates a power ratio during a GSM frame of the possible GSM channel, for a minimum of 11 consecutive GSM frames. The wireless communication device then determines that the possible GSM channel is a GSM channel of interest if the power ratio exceeds the single-frame threshold during one of the 11 consecutive GSM frames. In another example, the wireless communication device calculates the power ratio during a GSM frame of a possible GSM channel and accumulates the power ratios for a pre-defined period of time (e.g., 51 milliseconds). The wireless communication device then checks if the accumulated power ratio values exceed an accumulated-frame threshold and determines that the possible GSM channel is the GSM channel of interest if the threshold is exceeded. Various adjustments to the threshold can be made depending on factors such as: how close an ON FFT bin is to a chosen center or offset frequency, the power level of signals in the possible GSM channel, and/or an estimate of noise in the possible GSM channel. After detecting a GSM channel of interest, the wireless communication device may use a standard narrowband GSM receiver to receive and acquire a GSM signal from the GSM channel of interest.

This method helps to detect GSM channels of interest much faster than a conventional wireless communication device because it can survey up to 25 narrow GSM channels simultaneously within a 5 MHz bandwidth rather than survey only one narrow GSM channel at a time. Hence, the method saves power and time for the wireless communication device when searching for a GSM channel of interest.

Figure 4:
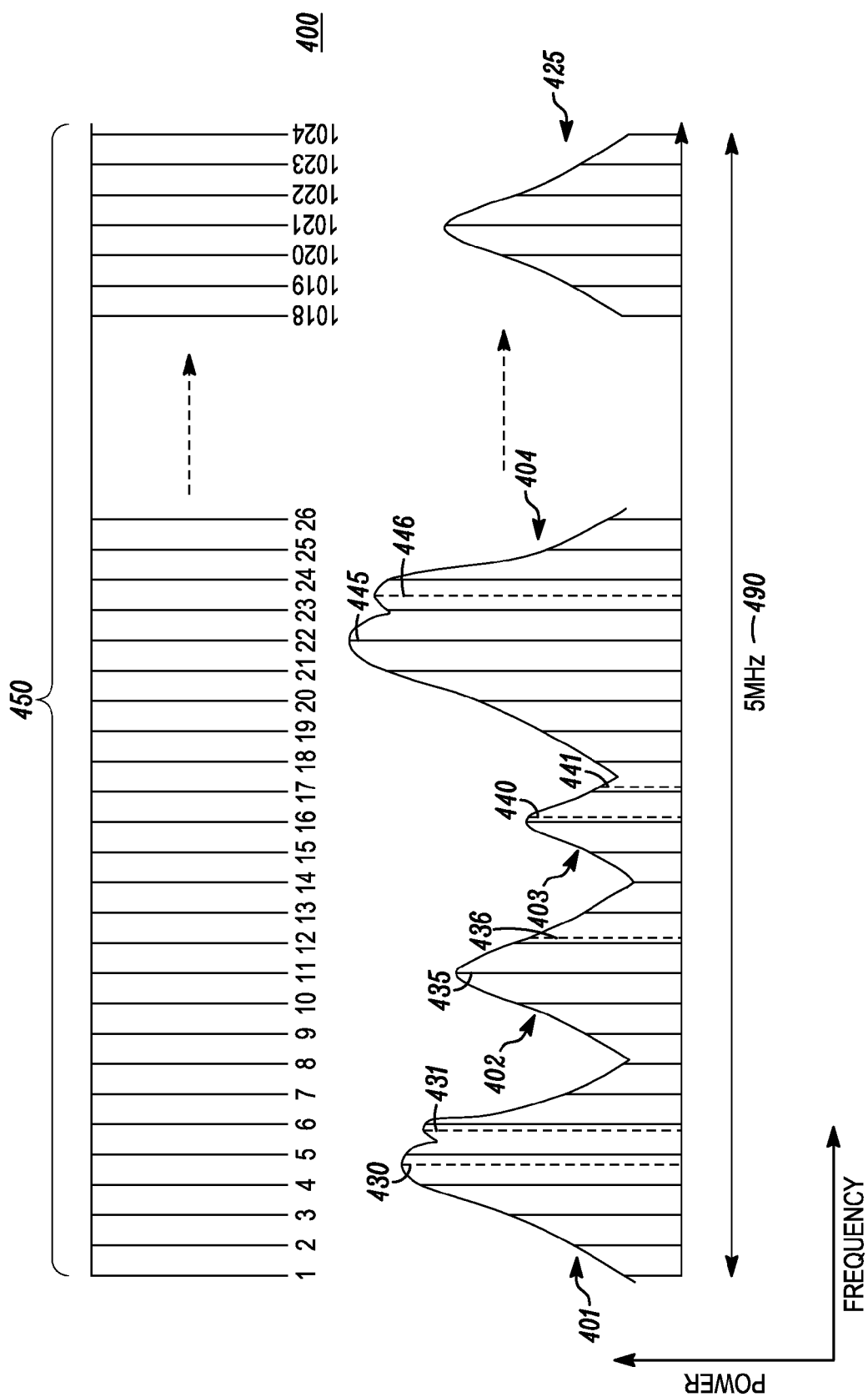
FIG. 4 is an example of a wide band signal and various FFT bins in accordance with some embodiments.

FIG. 4 is an example diagram 400 of a wide band signal 490 and various FFT bin frequencies 450 in accordance with some embodiments. In the example of FIG. 4, a wide bandwidth receiver and an LPF (such as wide bandwidth receiver 120 and LPF 140 shown in FIG. 1) down-converts and limits received time domain digital signals to a 5 MHz wide frequency band at baseband. Within any given 5 MHz frequency band there are theoretically up to 25 possible GSM channels 401, 402, 403, 404, . . . , and 425; and each possible GSM channel is spread over a standard frequency band of 200 KHz. Note that some 5 MHz frequency bands may have fewer than 25 possible GSM channels due to spectrum allocation in different geographic locations.

For a first possible GSM channel 401, the selector (such as selector 195 shown in FIG. 1) chooses the pair of frequencies 430, 431 corresponding to the center frequency of the first possible GSM channel 401 and to the synchronization burst frequency of the first possible GSM channel 401. Similarly, for the second possible GSM channel 402, the selector chooses the pair of frequencies 435, 436 corresponding to the center frequency and synchronization burst frequency of the second possible GSM channel 402. For the third possible GSM channel 403, the selector chooses the pair of frequencies 440, 441 corresponding to the center frequency of the third possible GSM channel 403 and to the synchronization burst frequency of the third possible GSM channel 403. Similarly, for the fourth possible GSM channel 404, the selector chooses the pair of frequencies 445, 446 corresponding to the center frequency and the synchronization burst frequency of the fourth possible GSM channel 404. In the same way, the selector chooses pairs of frequencies for all the possible GSM channels 401, 402, 403, 404, . . . , and 425.

After choosing the pairs of frequencies, the selector, configures the FFT processing module 150 (see FIG. 1) to obtain frequency domain signals at the ON FFT bins for each of the possible GSM channels 401, 402, 403, 404, . . . , and 425. In the example of FIG. 4, the plurality of FFT bins 450 (equivalent to FFT bins from the FFT processing module 150 shown in FIG. 1) are evenly spaced over the wide range of frequencies (5 MHz). Now, the selector turns ON the FFT bin 5 and FFT bin 6 closest to the chosen pair of frequencies 430, 431 for the first possible GSM channel 401. Similarly, the selector turns ON the FFT bins 11 and 12 closest to the chosen pair of frequencies 435, 436 for the second possible GSM channel 402, the FFT bins 16 and 17 closest to the chosen pair of frequencies 440, 441 for the third possible GSM channel 403, the FFT bins 22 and 24 closest to the chosen pair of frequencies 445, 446 for the third possible GSM channel 403, and so on.

Given the wide band signal 490 shown in this example, the power ratios for two pairs of frequency domain signals at FFT bins 5, 6 and FFT bins 22, 24 should be above a threshold. (The power ratios and threshold could be determined either using a single-frame or an accumulated-frame method). Then, the affiliated first and fourth possible GSM channels 401, 404 are deemed GSM channels of interest, and a conventional GSM receiver can scan for and acquire one of those GSM channels. Given that the power level of the fourth possible GSM channel 404 is higher than the power level of the first possible GSM channel 401, the wireless communication may attempt to acquire possible GSM channel 404 first, and if unable to acquire possible GSM channel 404 it may attempt to acquire possible GSM channel 401 next.

This method of turning ON specific FFT bins from the plurality of FFT bins helps to save power. In the above example, for 25 possible GSM channels only 50 out of 1024 FFT bins will be turned ON which means that only a fraction of the power is used to convert the time domain digital signal relative to a complete 1024 point FFT frequency conversion. And processing all the 25 possible GSM channels 401, 402, 403, 404, . . . , and 425 is done simultaneously which helps to detect the GSM channel of interest much faster than a conventional wireless communication device. Hence, the method saves power and time for the wireless communication device when detecting a GSM channel of interest.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment can be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

I claim:

1. A method in a wireless communication device for detecting a GSM channel of interest, the method comprising:
   receiving analog signals spread over a wide bandwidth;
   identifying a possible GSM channel within the received analog signals;
   sampling the analog signals to produce a time domain digital signal;
   choosing a pair of frequencies that correspond to a center frequency of the possible GSM channel and a synchronization burst frequency of the possible GSM channel;
   converting the time domain digital signal at the chosen pair of frequencies into a first frequency domain digital signal and a second frequency domain digital signal;
   calculating a power ratio between the first frequency domain digital signal and the second frequency domain digital signal; and
   determining that the possible GSM channel is the GSM channel of interest, if the power ratio exceeds a threshold.

2. The method of claim 1, wherein the receiving includes:
   down-converting the wide bandwidth of analog signals to baseband.

3. The method of claim 1, wherein the synchronization burst frequency is 67.7 KHz above the center frequency of the possible GSM channel.

4. The method of claim 1, wherein the determining further comprises:
   accumulating the power ratio for the possible GSM channel for a pre-defined period of time; and
   checking if the accumulated power ratio exceeds the threshold.

5. The method of claim 4, wherein the pre-defined period of time is greater than 50 milliseconds.

6. The method of claim 1, wherein determining further comprises:
   checking if the power ratio for a GSM frame of the possible GSM channel exceeds the threshold.

7. The method of claim 6, wherein the checking is performed for at least 11 consecutive GSM frames.

8. A wireless communication device for detecting a GSM channel of interest, the device comprising:
   a wide bandwidth receiver for receiving a wide band of frequencies;
   an analog to digital converter (ADC), coupled to the wide bandwidth receiver, for sampling the wide band of frequencies to create a time domain digital signal;
   a selector, coupled to the ADC, for choosing a pair of frequencies that correspond to a center frequency of a possible GSM channel and a synchronization burst frequency of the possible GSM channel;
   an FFT processing module, coupled to the selector, for converting the time domain digital signal into a first frequency domain digital signal near the center frequency and a second frequency domain digital signal near the synchronization burst frequency;
   a power ratio calculator, coupled to the FFT processing module, for calculating a power ratio between the first frequency domain digital signal and the second frequency domain digital signal for the possible GSM channel; and
   a processor, coupled to the power ratio calculator, for determining that the possible GSM channel is the GSM channel of interest, if the calculated power ratio for the possible GSM channel exceeds a threshold.

9. The device of claim 8 further comprising:
   a low pass filter (LPF), coupled to the ADC, for limiting the time domain digital signal to a specified frequency range.

10. The device of claim 8 further comprising:
    a memory, coupled to the processor, for storing a list of possible GSM channels.

11. The device of claim 10, wherein the list comprises:
    a GSM channel previously used by the wireless communication device.

12. The device of claim 10, wherein the list comprises:
    a GSM channel indicated by an alternate communication system.

13. The device of claim 10, wherein the list comprises:
    a GSM channel preset by a user.

14. The device of claim 8 further comprising:
    a correlator, coupled to the power ratio calculator, for accumulating the power ratio for the possible GSM channel for a pre-defined period of time.

15. The device of claim 8, wherein the selector configures the FFT processing module to activate only constituent elements of the FFT processing module that contribute to converting the time domain digital signal into the first frequency domain digital signal near the center frequency and the second frequency domain digital signal near the synchronization burst frequency.

16. The device of claim 8, wherein the selector configures, for all frequencies except the pair of frequencies, an input basis function of the FFT processing module to a null value.

17. The device of claim 8, wherein the possible GSM channel comprises up to 25 possible GSM channels.

18. The device of claim 8 further comprising:
    a memory, coupled to the processor, for storing the threshold.

19. The device of claim 8, wherein the threshold is dynamically adjusted by the processor.

20. The device of claim 19, wherein the processor dynamically sets the threshold based on the power level of signals in the possible GSM channel.

21. The device of claim 20, wherein the processor dynamically sets the threshold based on an estimate of noise in the possible GSM channel.

* * * * *